United States Patent [19]

Beakes

[11] Patent Number: 5,685,061
[45] Date of Patent: Nov. 11, 1997

[54] STATOR MANUFACTURING METHOD

[75] Inventor: John M. Beakes, Fairborn, Ohio

[73] Assignee: Globe Products Inc., Huber Heights, Ohio

[21] Appl. No.: 425,866

[22] Filed: Apr. 20, 1995

[51] Int. Cl.$^6$ .................................................. H02K 15/095
[52] U.S. Cl. ............................. 29/596; 29/732; 242/433
[58] Field of Search ........................... 29/596, 597, 732, 29/736, 564.1, 564.6, 564.8; 242/433, 433.1, 433.2

[56] References Cited

U.S. PATENT DOCUMENTS

| | | | |
|---|---|---|---|
| 3,251,559 | 5/1966 | Moore | 242/1.1 |
| 3,747,187 | 7/1973 | Colwell | 29/203 |
| 3,901,454 | 8/1975 | Reiger, Jr. | 242/1.1 R |
| 3,926,421 | 12/1975 | Reiger, Jr. et al. | 269/57 |
| 4,074,418 | 2/1978 | Pearsall | 29/596 |
| 4,086,117 | 4/1978 | Pearsall | 156/212 |
| 4,951,379 | 8/1990 | Clemenz | 29/597 |
| 4,997,138 | 3/1991 | Luciani et al. | 242/7.03 |
| 5,090,108 | 2/1992 | Banner et al. | 29/596 |
| 5,186,405 | 2/1993 | Beakes et al. | 242/1.1 R |
| 5,193,755 | 3/1993 | Luciani | 242/1.1 R |
| 5,239,743 | 8/1993 | Santandrea | 29/596 |
| 5,341,997 | 8/1994 | Luciani | 242/1.1 R |
| 5,370,324 | 12/1994 | Beakes et al. | 242/1.1 R |
| 5,495,659 | 3/1996 | Beakes et al. | 29/736 |

OTHER PUBLICATIONS

Commonly-owned U.S. patent application Ser. No. 08/578, 822.
See accompanying Information Disclosure Statement regarding prior public use and sale of clamps similar in appearance to clamps shown in U.S. Pat. No. 4,951,379.
See accompanying Information Disclosure Statement regarding prior public use and sale of subject matter claimed in U.S. Pat. No. 5,495,659.
See accompanying Information Disclosure Statement regarding prior public disclosure of subject matter disclosed in instant application.

*Primary Examiner*—Carl E. Hall
*Attorney, Agent, or Firm*—Roger S. Dybvig

[57] ABSTRACT

A tamping assembly is provided at a stator winding station that includes a tamping member and an air actuator which drives the tamping member toward and away from a temporary wire clamp. The temporary wire clamp has a movable jaw which is forced open to receive a stator coil lead wire by engagement of the tamping member therewith. Extended and retracted positions of the tamping member are determined by proximity detectors that detect the corresponding extended and retracted positions of a guide rod connected to and movable with the tamping member. Plural tamping assemblies are provided, one for each temporary wire clamp. The tamping assemblies are used in conjunction with lead pull assemblies which locate segments of stator coil lead wires in positions to be inserted into the temporary clamps when forced open by the tamping members.

13 Claims, 3 Drawing Sheets

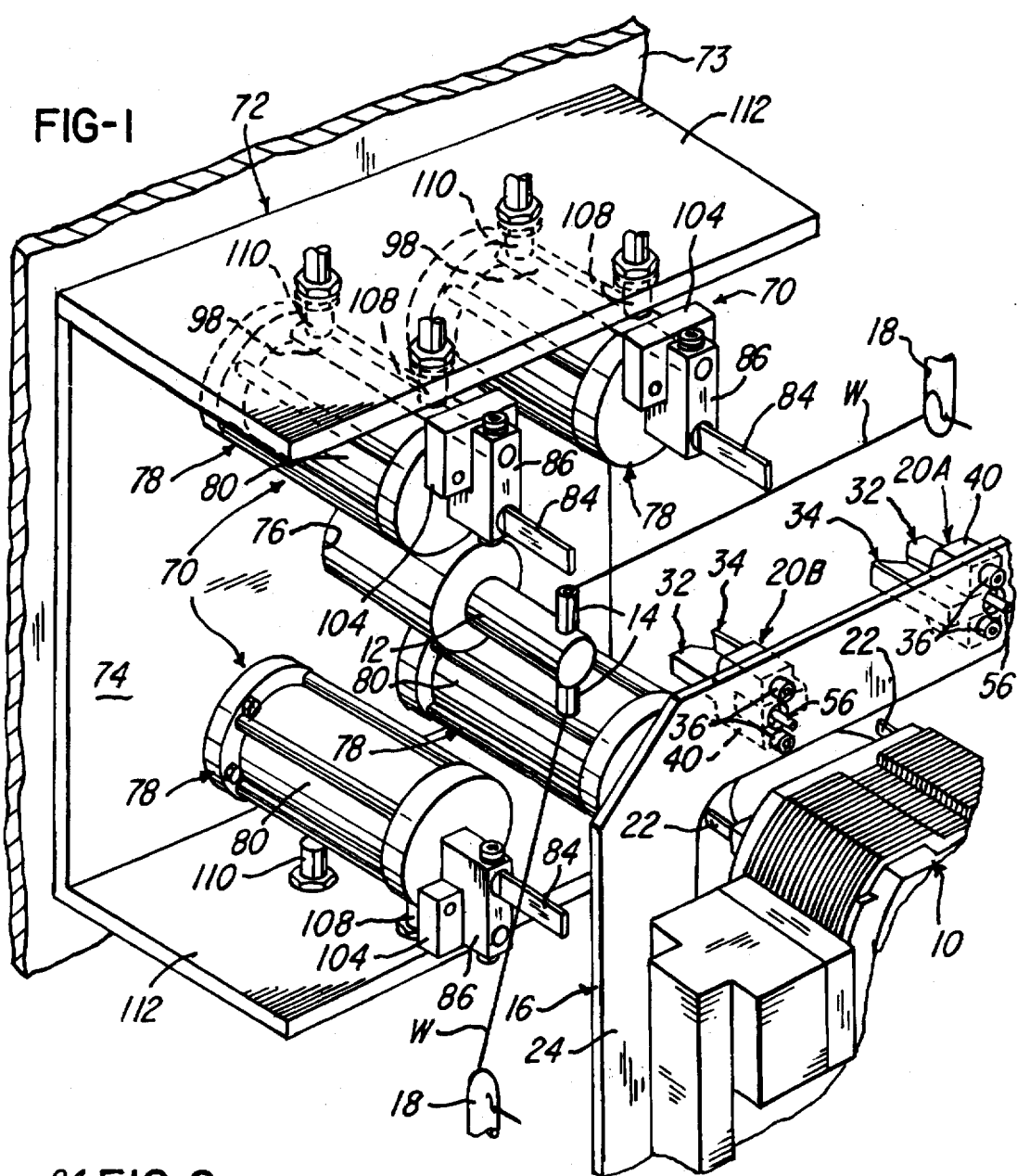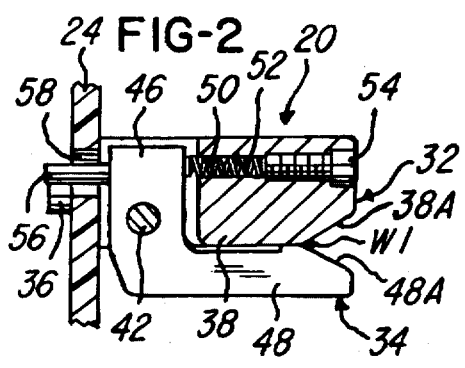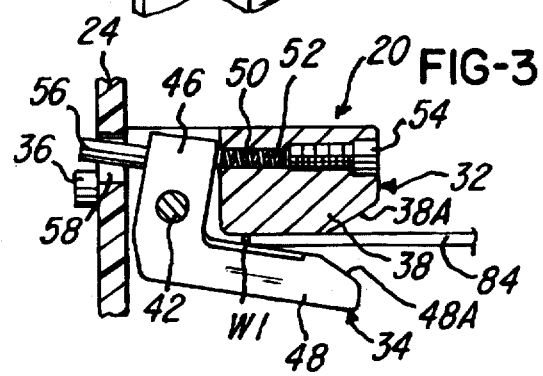

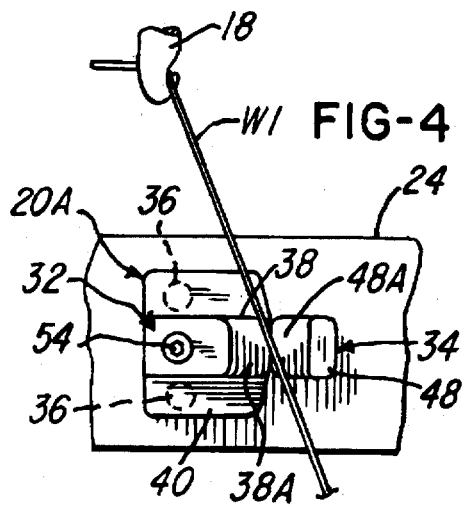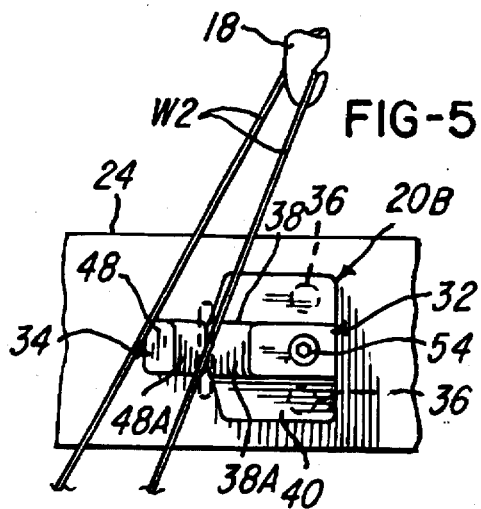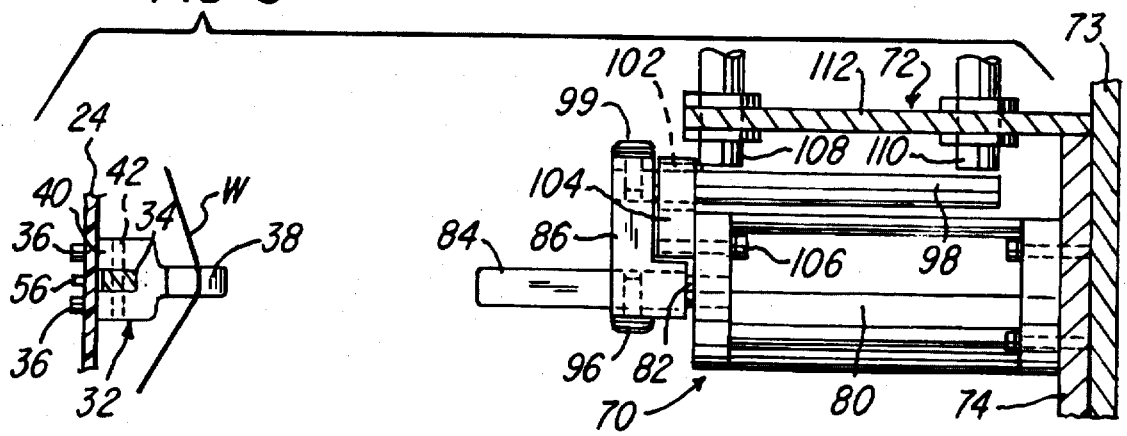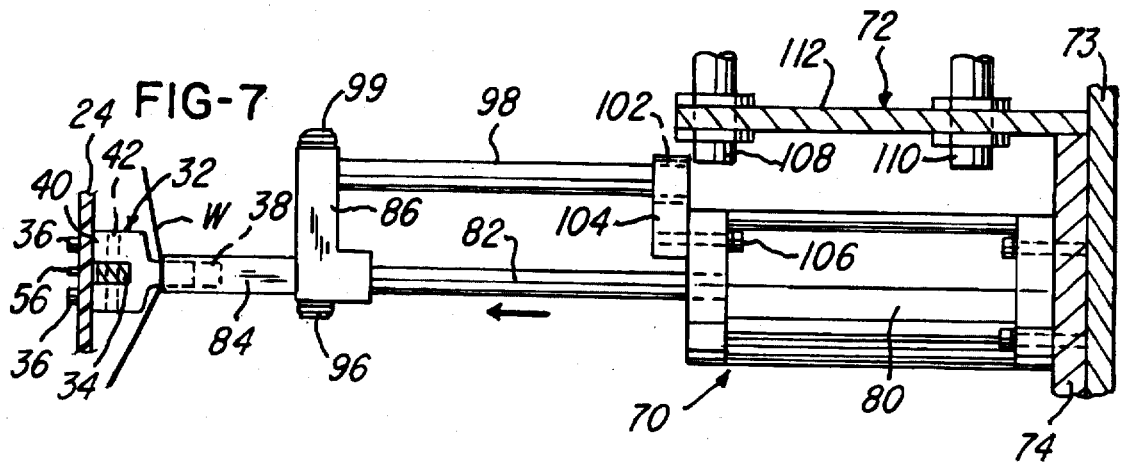

STATOR MANUFACTURING METHOD

FIELD OF THE INVENTION

This invention relates to a stator manufacturing method and apparatus and, although not necessarily so limited, is especially adapted for the manufacture of 2-pole stators for electric motors or other electrical devices.

INCORPORATION BY REFERENCE

The disclosures of Alvin C. Banner et al. U.S. Pat. No. 5,090,108, granted Feb. 28, 1992, and John M. Beakes et al. U.S. Pat. No. 5,186,405, granted Feb. 16, 1993, are hereby incorporated by reference herein.

BACKGROUND OF THE INVENTION

Modern stator manufacturing production lines include several different stations at which different manufacturing operations are performed. One such operation that is frequently accomplished at an early stage in the process for manufacturing a 2-pole stator is to assemble stator coil terminals or supports therefor on an unwound stator core. Thereafter, the stator coils are wound on the stator core pole pieces at a stator winding station using magnet wire having an electrically insulating coating. A common practice in use at this time is to temporarily clamp the stator coil lead wires to wire clamps during the winding process. At a later manufacturing stage, the lead wires are connected to the terminals mounted on the stator core at a coil lead terminating station.

One type of stator manufacturing machine, known as a turret winder, such as the machine 50 disclosed in above-mentioned Beakes et al. U.S. Pat. No. 5,186,405, includes a turret by which unwound stators having cores on which terminal members have previously been assembled are moved to a stator winding station at which the stator coils are wound. The freshly wound stators are then moved to a lead connect station at which the stator coil lead wires are connected to the terminal members on the core. Lead pull assemblies at the winding station have wire grippers which are manipulated to place the stator coil lead wires into temporary wire clamps that are moved to the lead connect station along with the wound stator. Mechanisms at the lead connect station remove the stator coil lead wires and connect them to stator terminals or terminal support members on the stator core. As known to those familiar with the stator winding art, the same general method is practiced using different types of mechanisms for transporting the stator from the winding station to the coil lead terminating station, such as shown in the above mentioned Banner et al. U.S. Pat. No. 5,090,108.

Various temporary wire clamps have been used. A simple wire clamp having jaws that are spring biased toward one another may be sufficient. However, wires temporarily held by a spring-biased clamp may occasionally may remain stuck in the clamp and interfere with subsequent manufacturing procedures. Wire clamps that are spring-biased opened and closed by individual air actuators (one for each temporary clamp) have also been used. With such a clamp, it is possible to ensure that a coil lead wire of any of various different sizes can be inserted into the clamp when spring-biased open and then securely clamped when the clamp jaws subsequently close on the wire by operation of the air actuator. However, the air actuators had to be transferred with the clamps and the expense, complexity, and space requirements for the air actuators and their controls made their use undesirable.

In a commonly-owned copending application of John M. Beakes et al., Ser. No. 08/219,847, filed Mar. 30, 1994, titled Stator Manufacturing Method and Apparatus, a stator manufacturing method and apparatus is disclosed which embodies an improved temporary wire clamp method and apparatus by which stator coil lead wires can not only be satisfactorily gripped but will also assuredly be released at the coil lead terminating station. The jaws of the temporary wire clamps are spring-biased closed and opened by air actuators which are permanently located at the coil lead terminating station. Accordingly, the jaws of the temporary wire clamps are sufficiently spaced apart when opened to assure that the coil lead wires will not remain gripped to them.

If a stator winder is to be used for winding stators having but a single wire size, the springs which bias the clamp jaws may be selected to enable the lead wires to be pulled into the spring clips by lead pull devices, the jaws being forced apart by the lead wires while they are being pulled by the lead pull devices. However, stator winding machines must often be capable of winding stators having coils wound from various different wire sizes. The temporary clamps must, accordingly, have springs strong enough to maintain a grip on stiff, relatively large diameter lead wires which may have a self-bias to spring out to the clamps. However, if the springs are strong enough that the clamps maintain a firm grip on wires of the larger sizes, the clamps may not be effective for use with finer wires because manipulations of the lead pull devices to insert finer wires into the clamps can cause the finer wires to bend around or break against the clamps rather than enter them.

SUMMARY OF THE INVENTION

The primary object of this invention is to provide a method and apparatus for ensuring that stator coil lead wires are fully engaged and securely clamped by the temporary wire clamps.

The stator manufacturing apparatus in accordance with this invention includes, in addition to the lead pull devices, clamp-opening mechanisms mounted at the stator winding station in fixed relation to the machine bed, each including a simple tool engageable with a clamp for opening the same. The presently preferred clamp-opening mechanisms comprise plural tamping mechanism, each of which includes a tamping blade aligned with one of the wire clamps, an air actuator having a cylinder and a piston rod to which the tamping blade is connected and that drives the tamping blade into engagement with the movable jaw of the wire clamp. The tamping blade thereby forces the movable jaw to separate from the other clamp jaw sufficiently to ensure that the lead wire enters the temporary clamp. Upon subsequent retraction of the tamping blade, the clamp closes and securely grips the lead wire.

In operation, a lead pull device is manipulated to draw a segment of the lead wire across a wire clamp. With some wire sizes, the wire segment may be under sufficient tension to force the clamp jaws apart and enter between the jaws. With other wire sizes, it may not be possible to place the lead wire under a tension sufficient to force the clamp jaws apart. In either case, a segment of the lead wire is located by the lead pull device in the path of movement of the tamping blade so that, if the lead wire is not already fully seated within clamp when the tamping blade forces the clamp jaws apart, the tamping blade will engage and push the lead wire fully into the clamp.

Plural, substantially identical tamping mechanisms are provided so that, preferably, there is one tamping mechanism for each one of the temporary clamps.

In the presently preferred embodiment of this invention, each tamping mechanism includes a guide rod guided by a bearing mounted on the tamping air cylinder for movement along an axis parallel to the axis of movement of the tamping blade and a coupling member connecting the guide rod to the piston rod so that the blade and the guide rod move in unison. Additionally, it is preferred that a pair of proximity detectors are mounted in fixed relation to the cylinder and positioned to indicate whether or not the guide rod is fully extended or fully retracted by operation of its associated air actuator and, accordingly, whether the tamping blade is fully extended into engagement with the temporary wire clamp or is fully retracted away from the temporary wire clamp.

Furthermore, it is presently preferred to provide a tamper support assembly fixed at the winding station upon which each of the tamping mechanisms is mounted. The tamper support assembly includes a tamper support plate which has an aperture through which the winding ram of the stator winding machine extends.

The method and apparatus of this invention are applicable both for stator coil start wires which may be clamped while the stator coil is being wound and to stator coil finish wires which are clamped after the coil is fully wound.

Other objects and advantages will become apparent from the following description and the drawings.

BRIEF DESCRIPTION OF THE DRAWINGS

FIG. 1 is a simplified, fragmentary, perspective view of a stator winding station of a stator winding machine in accordance with this invention and a stator with which this invention may be used.

FIG. 2 is a fragmentary, cross-sectional view of a temporary wire clamp and a clamp support plate of FIG. 1, and also showing, in cross section, a lead wire positioned to enter and be clamped by the wire clamp.

FIG. 3 is a fragmentary, cross-sectional view of the temporary clamp, the clamp support plate and the lead wire of FIG. 2 but at a later stage of manufacture of the stator and also showing a tamping blade in accordance with this invention.

FIG. 4 is a fragmentary front elevational view showing the position of a stator coil start wire relative to a temporary wire clamp of FIG. 1 at one stage in the manufacture of the stator.

FIG. 5 is a fragmentary front elevational view similar to FIG. 4 but showing the position of a stator coil finish wire relative to another temporary wire clamp of FIG. 1 at a later stage in the manufacture of the stator.

FIG. 6 is a fragmentary, side elevational view, with parts in cross section, of a temporary wire clamp and its support of FIG. 1, a lead wire, and a tamping assembly and its support of FIG. 1, just before the lead wire is inserted into the temporary wire clamp.

FIG. 7 is a fragmentary, side elevational view, with parts in cross section, of the same parts illustrated in FIG. 6 but showing the portion of parts when a lead wire is inserted into the temporary wire clamp.

DETAILED DESCRIPTION

Figure 8:
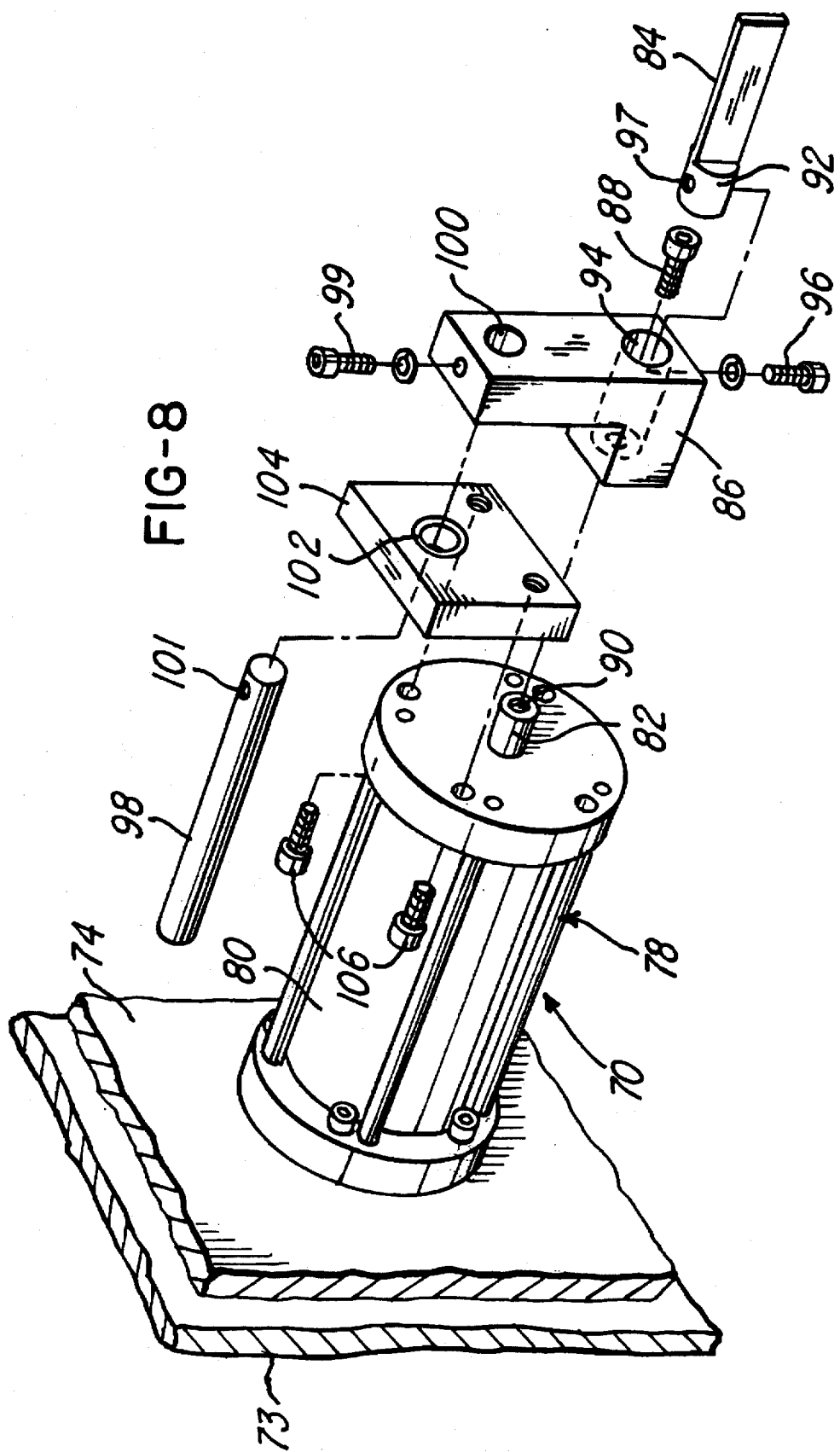
FIG. 8 is a simplified, fragmentary, partially exploded perspective view of a tamping assembly of FIG. 1 and a tamping mechanism support assembly.

With reference to FIG. 1, this invention is directed to the manufacture of a 2-pole stator 10 utilizing a stator winding machine represented by winding ram 12 having a pair of wire-exit needles 14. As will be apparent to those familiar with the art, FIG. 1 shows the stator 10 held by a stator support and clamp assembly 16 at a winding station in position to receive two field coils simultaneously wound from magnet wires W drawn from sources (not shown) of wire under tension and wound around stator core pole pieces (not shown) by repeated cycles of reciprocation and oscillation of the winding ram 12. At the outset of the coil winding operation, the end of each magnet wire W is gripped by a wire gripper 18 which is part of a lead pull assembly (not otherwise shown herein) which so manipulates the grippers 18 that the wires W are held clamped as illustrated in FIG. 1 in preparation for the winding of the stator coils and, after the winding of the coils is commenced, so manipulated that the lead wire segments, called "start wires," one of which is designated W1 in FIG. 4, extending from the grippers 18 to the coils being wound are moved into alignment with respective ones of a pair of temporary wire clamps. The temporary wire clamps are generally designated 20, with the start wire clamps designated 20A in FIGS. 1 and 4. In typical cases, the wire grippers 18 are then moved so as to draw the start wires W1 into the temporary wire clamps 20A and thereafter opened to release the start wires W1 which are now gripped by the temporary wire clamps 20A.

After the winding of the coils is completed, the wire grippers 18 are moved to hook and operated to grip the wire segments, called "finish wires," such as segment W2 illustrated in FIG. 5, leading from the newly wound coils to the winding needles 14, and align them with a different pair of wire clamps 20B, termed "finish wire clamps" herein and identified as clamps 20B in FIGS. 1 and 5. The wire grippers 18 are then moved so as to draw the finish wires W2 into the latter temporary wire clamps 20B. Wire cutting mechanisms (not shown) forming part of the wire grippers 18 cut the finish wires W2 free from the grippers 18 so that the stator 10 can be removed, along with the temporary wire clamps 20, from the winding station and transferred to a lead connect station (not shown). The segments of the wires W that lead to the needles 14 remain gripped by the wire grippers 18, which are returned to the positions thereof illustrated in FIG. 1 in preparation for the winding of the next stator. At the lead connect station, the lead wires W1 and W2 are removed from the temporary wire clamps 20 and connected to terminal members on the face of the stator 10, such as terminal members 22 shown in FIG. 1.

In the embodiment illustrated in the drawings, the temporary wire clamps 20 are shown mounted in fixed relation to a stator mounted on the stator support and clamp assembly 16 by means of a clamp support plate 24. In this respect, the apparatus described above may be the same as the corresponding apparatus illustrated in the above-mentioned Beakes et al. U.S. Pat. No. 5,186,405. However, it is to be understood that the invention described below could be applicable to other types of winding machines, such as that shown in the above mentioned Banner et al. U.S. Pat. No. 5,090,108. In addition, this invention does not require the use of the specific lead pull assembly disclosed in Beakes et al. U.S. Pat. No. 5,186,405 but instead could use any one of various lead pull assemblies known in the art.

With reference to FIGS. 2 through 5, each temporary wire clamp 20 may include a pair of wire clamp members, namely a fixed clamp member 32 and a movable or pivotal clamp member 34 made from hardened tool steel or other suitable material. Fixed clamp member 32 is fixedly mounted on the clamp mounting plate 24 by screws 36 and comprises a body member having a horizontal jaw 38 and a bifurcated portion abutting the clamp mounting plate 24 that forms a clevis yoke 40 through which a clevis pin 42 extends. Clevis pin 42, which may simply be a shoulder screw, has a threaded end engaged in a tapped hole (not shown) in one of the bifurcations of the clevis yoke 40. The pivotal clamp member 34 comprises an L-shaped body member having a generally vertical leg 46 pivotally supported by the clevis pin 42. Pivotal clamp member 34 further includes a generally horizontal, movable clamp jaw 48 that confronts the fixed clamp jaw 38.

A clamp spring 50 is mounted partly within a through bore 52 in the fixed clamp member 32 and has one end which bears against the outwardly facing surface of the vertical leg 46 of the pivotal clamp member 34. The other end of the clamp spring 50 abuts against the inner end of a retaining screw 54 which is located in the tapped, outer end of the through bore 52. Clamp spring 50 is under compression so that it pushes against the vertical leg 46 of the pivotal clamp member 34, which causes the pivotal clamp jaw 48 to be pressed against the fixed jaw 38. Accordingly, a lead wire, such as wire W1 inserted between the fixed jaw 38 and the movable jaw 48 will be securely clamped between the jaws 38 and 48. To help guide the lead wires W1 and W2 into a clamp 20, the confronting free end surfaces, designated 38A and 48A, respectively, of the jaws 38 and 48 are bevelled outwardly away from one another to provide a large mouth or gap between them so that there is a substantial permissible tolerance in the position and orientation of a lead wire as it is drawn toward clamping engagement with a clamp 20.

With reference to FIGS. 1, 2 and 3, in order to release the clamped wire from a temporary clamp 20, a release pin 56 is fixed in the vertical leg 46 of the pivotal movable clamp member 34 and extends rearwardly completely through and beyond a through bore 58 in the clamp mounting plate 24. The release pin 56 is provided so that an air actuator (not shown) at the lead connect station (not shown) can be used to pivot the movable clamp member 34 to open the temporary wire clamp 20 and release its grip on the wire lead held thereby. This aspect of the wire grippers 18 is not important to an understanding of present invention so it is not further shown or described herein. Furthermore, it will become apparent that this invention could be used with other spring-biased clamps and, in its broader aspects, with clamps that are closed by means other than a spring bias.

With reference to FIGS. 1 and 6 through 8, in accordance with this invention, there are plural clamp-opening mechanisms, each generally designated 70, affixed to rigid support assembly, generally designated 72, mounted in any suitable fashion on a mounting plate 73 upon which is supported the lead pull assembly that includes the wire gripper 18, so that the clamp-opening mechanisms 70 are located at the winding station. Rigid support assembly 72 includes a vertical plate 74 provided with a central aperture 76 through which the winding ram 12 can reciprocate and oscillate. There is preferably one clamp-opening mechanism 70 for each of the wire clamps 20 that can be manipulated to force the wire clamps 20 open to ensure that the lead wires W1 and W2 can enter the clamps 20 and thereafter manipulated to permit the wire clamps 20 to be closed.

With reference to FIG. 8, in the presently preferred embodiment of this invention, the clamp-opening mechanism 70 is a tamping mechanism that comprises a double-acting fluid actuator 78, which is preferably an air actuator, mounted on the vertical plate 74 that includes a cylinder 80 and a piston rod 82. (The air lines to the air actuators 78 are not shown, such being entirely conventional and well understood in the art.) A tamping blade 84 is mounted on the outer end of the piston rod 82 by means of an L-shaped mounting bracket 86 connected to the outer end of the piston rod 82 by a shoulder screw 88 which is threadedly engaged with internal threads in a bore 90 in the outer end of the piston rod 82. The tamping blade 84 has a cylindrical inner end 92 which is held within a bore 94 opening to the outer end face of the shorter leg of the L-shaped bracket 86 in alignment with the piston rod 82, and the cylindrical inner end 92 is rigidly and non-rotatably secured within the bore 94 by a shoulder screw 96 which extends into a tapped hole 97 in the cylindrical inner end 92. The tamping blade 84 is so aligned with the confronting clamp 20 that the free end of the blade 84 confronts the sloping surface 48A of the movable jaw 48. As the tamping blade 84 is extended toward the confronting clamp 20, as will be described below, the blade 84 slides relative to the bevelled surface 48A, thus camming the clamp 20 open by causing the clamping surface of the movable jaw 48 to be cammed away from the confronting clamping surface of the fixed jaw 38. The side face of the tamping blade 84 nearest the fixed jaw 38 lies in a plane which is parallel and sufficiently close to the plane of the clamping surface of the fixed jaw 38 that the tamping blade 84 can enter the clamp 20 between its jaws 38 and 48 as shown in FIG. 3. To accurately maintain the proper orientation of the tamping blade 84, a guide rod 98 is rigidly and non-rotatably secured within a bore 100 in the longer leg of the L-shaped bracket 86 by means of a shoulder screw 99 which engages within a tapped hole 101 in the guide rod 98, which bore 100 has an axis parallel to the tamping blade-receiving bore 94. The guide rod 98 is received within a bearing 102 in a bearing mounting plate 104 affixed by screws 106 to the face of the actuator cylinder 80 by which the guide rod 98 is guided along a horizontal path parallel to the path of movement of the tamping blade 84.

With reference to FIGS. 2 through 7, in operation of the apparatus of this invention, shortly after the commencement of the winding of a stator coil by reciprocatory and oscillatory movement of the winding ram 12, the wire gripper 18 is manipulated to align a start wire W1 with a selected start wire clamp 20A as shown in FIG. 4 and moved toward the clamp mounting plate 24 to cause the lead wire W2 to be drawn toward the selected clamp 20A. The wire may be sufficiently strong and under sufficient tension that it forces the pivotal clamp jaw 34 to pivot so that the wire W1 enters the clamp 20A. However, the wire W1 may simply bend around the clamp 20A and not enter the clamp 20, as is indicated by the lead wire W1 in FIG. 2. In either case, the tamping blade 84 is extended by operation of the actuator 78, as shown in FIG. 7, whereupon the tamping blade 84 engages the movable clamp jaw 34 and pivots it to an open position as shown in FIG. 3. The forced opening of the clamp 20A may cause the wire W1, which is still held clamped by the wire gripper 18 and under tension, to snap into, or deeper into, the clamp 20. Even if this does not occur, the tamping blade 84 will push the wire W1 fully into the clamp as shown in FIG. 3. Thereafter, the actuator 78 operates to retract the tamping blade 84 to its position shown in FIG. 6 so that the clamp 20A is closed by its spring 50. The wire gripper 18 can then be operated to release the start wire W1 in preparation for gripping the finish wire W2 leading from the same coil (not shown) being wound.

After the coil is fully wound, the wire gripper 18 is moved to hook the segment of wire W leading from the newly wound coil to the associated winding needle 14 and to draw the wire W toward another the finish wire clamp 20B, as illustrated in FIG. 5, so that the finish lead W2 extending from the wound coil (not shown) is aligned with the finish wire clamp 20B. Gripper 18 then grips the wire W and moves axially toward the clamp support plate 24 to draw the finish wire W2 toward the finish wire clamp 20B. As with a start wire W1, the finish wire W2 may be sufficiently strong and under sufficient tension that it forces the pivotal clamp jaw 34 to pivot so that the wire W2 enters the clamp 20, or it may only bend around the finish wire clamp 20B and not enter the clamp 20B. In either case, the tamping blade 84 aligned with the finish wire clamp 20B is extended by operation of its associated actuator 78 whereupon the tamping blade 84 engages the movable clamp jaw 34 of the finish wire clamp 20B and pivots it to an open position as shown in FIG. 3.

The forced opening of the clamp 20B may cause the wire W2, which is still held clamped by the wire gripper 18 and under tension, to snap into, or deeper into, the clamp 20B. Even if this does not occur, the tamping blade 84 will push the wire W2 fully into the clamp 20B in the same manner illustrated for the start wire in FIG. 3. Thereafter, the actuator 78 operates to retract the tamping blade 84 to its position shown in FIG. 6 so that the finish wire clamp 20B is closed by its spring 50. The wire gripper 18 is then operated so that the cutter (not shown) associated therewith cuts the finish wire W2 free from the gripper 18 whereupon the newly-wound stator 10 with its lead wires W1 and W2 held by the clamps 20 can be moved out of the winding station and transferred to the lead wire connect station (not shown). As previously described, the segment of the wire W leading from the wire gripper 18 to one of the winding needles 14 remains clamped to the wire gripper 18 in readiness for the winding of another stator and the wire gripper 18 is returned to the position thereof illustrated in FIG. 1.

For machine timing purposes, the extended and retracted positions of each of the guide rods 98 and, accordingly, the extended and retracted positions of each associated tamping blade 84 is sensed by a pair proximity detectors 108 and 110 mounted on one of two horizontal plates 112 in fixed relation to its associated actuator cylinder 80. As is evident in FIG. 1, the horizontal plates 112 are part of the rigid support assembly 72 and are connected in any suitable manner to the vertical plate 74. Those familiar with automatic winding machines will readily understand that the machine control circuitry (not shown) will include switches that will change from opened to closed, or vice versa, or change logic states when the associated guide rod 98 moves to the extended position shown in FIG. 7 and thereby moves away from the face of the proximity detector 108, so that the machine control circuitry will receive a signal indicating that the associated tamping blade 84 is fully extended. Similarly, upon subsequent retraction of the associated tamping blade 84, the condition of a switch or logic state will change when the guide rod 98 moves in front of the face of the proximity detector 110. Machine control circuitry for this purpose may be conventional and is not further shown or described herein.

It will be appreciated that the foregoing description relative to the lead wires W1 and W2 will also apply to a lead wires (not shown) leading to and from the other stator coil (not shown). For this reason, there are four tamping mechanisms 70 and four pairs of proximity detectors 108 and 110 (one pair on each of the two horizontal support plates 112) illustrated in FIG. 1.

Here it may be observed that this invention could be practiced using temporary wire clamps other than the particular wire clamps 20 disclosed herein. It is important, however, that each wire clamp have at least one pivotal or otherwise movable jaw that can be moved to open or close the clamp by engagement of simple tool with the clamp. When the simple tool comprises a tamping blade as disclosed herein, the movable jaw must be spring biased, as by a coil spring, a leaf spring or an air spring, toward a second clamp jaw so as to clamp a lead wire between the two jaws, and which is movable by engagement of the tamping blade to open the clamp.

In the embodiment disclosed herein, there are four temporary wire clamps 20, two for the two start wires W1 and two for the two finish wires W2, mounted on the clamp mounting plate 24 and four clamp opening mechanisms 70 aligned with respective different ones of the wire clamps 20. Only two of the wire clamps 20 are illustrated in FIG. 1, but those familiar with the art will recognize that there would also be two essentially identical wire clamps on the clamp mounting plate 24 in alignment with the lower pair of clamp-opening assemblies 70. In practice, there will often be a need for more than four temporary wire clamps 20 in order to accommodate tap wires and in order to accommodate different stator terminal configurations. It will be understood that, in the presently preferred practice of this invention, there will be a tamping assembly aligned with each one of the wire clamps, regardless of the number of clamps. In this connection, the wire clamps will not always have jaws that meet one another along a vertical plane, as in the case of the illustrated clamp jaws 20. Accordingly, the tamping blades 84 may not be vertically oriented as shown in the drawings but will often be oriented other than vertically.

Although the presently preferred embodiments of this invention have been described, it will be understood that within the purview of the invention various changes may be made within the scope of the following claims.

I claim:

1. A stator manufacturing method comprising the steps of:
   supporting a stator core at a winding station;
   winding coils of insulated magnet wire onto said stator core;
   with a lead wire extending to one of said coils aligned with a temporary wire clamp having opposed jaws, opening said temporary wire clamp by moving a suitable tool between said jaws to ensure that said lead wire can enter said clamp.

2. The stator manufacturing method of claim 1 wherein said tool is moved between said jaws by an air actuator having a piston to which said tool is connected.

3. The stator manufacturing method of claim 1 wherein said tool is so manipulated that said clamp is closed after said wire enters said clamp.

4. A stator manufacturing method comprising the steps of:
   supporting a stator core at a winding station;
   winding coils of insulated magnet wire onto said stator core;
   with a lead wire extending to one of said coils aligned with a temporary wire clamp having a movable jaw and another jaw, said movable jaw biased to close said clamp, forcing open said temporary wire clamp by moving a tamping member into said clamp between said jaws so that said lead wire can enter said clamp.

5. The stator manufacturing method of claim 4 wherein said temporary wire clamp comprises a movable jaw and a fixed jaw, and said step of forcing open said clamp comprises engaging said movable jaw by said tamping member to cause said movable jaw to move to a clamp open orientation.

6. The stator manufacturing method of claim 5 wherein said tamping member pushes said lead wire into said temporary wire clamp between clamping surfaces of said jaws.

7. The stator manufacturing method of claim 4 wherein said lead wire is aligned with said temporary wire clamp by movements of a wire lead gripping assembly.

8. The stator winding method of claim 4 wherein said step of forcing open said wire clamp is accomplished while said coil is being wound.

9. The stator winding method of claim 4 wherein said lead wire is a finish wire extending from said coil, and said step of forcing open said wire clamp is accomplished after said coil is fully wound.

10. The stator manufacturing method of claim 1 further comprising the step of:

with a lead wire extending from one of said wound coils aligned with a temporary wire clamp having opposed jaws, opening said temporary wire clamp by moving a suitable tool between said jaws to ensure that said lead wire can enter said clamp.

11. The stator manufacturing method of claim 4 further comprising the step of:

with a lead wire extending from one of said wound coils aligned with a temporary wire clamp having a movable jaw and another jaw, said movable jaw biased to close said clamp, forcing open said temporary wire clamp by moving a tamping member into said clamp between said jaws so that said lead wire can enter said clamp.

12. A stator manufacturing method comprising the steps of:

supporting a stator core at a winding station;

winding coils of insulated magnet wire onto said stator core;

with a lead wire extending from one of said wound coils aligned with a temporary wire clamp having opposed jaws, opening said temporary wire clamp by moving a suitable tool between said jaws to ensure that said lead wire can enter said clamp.

13. A stator manufacturing method comprising the steps of:

supporting a stator core at a winding station;

winding coils of insulated magnet wire onto said stator core;

with a lead wire extending from one of said wound coils aligned with a temporary wire clamp having a movable jaw and another jaw, said movable jaw biased to close said clamp, forcing open said temporary wire clamp by moving a tamping member into said clamp between said jaws so that said lead wire can enter said clamp.

* * * * *